US009429136B2

United States Patent
Kusunoki et al.

(10) Patent No.: US 9,429,136 B2
(45) Date of Patent: Aug. 30, 2016

(54) CONTROL SYSTEM OF VARIABLE SPEED PUMPED STORAGE HYDROPOWER SYSTEM AND METHOD OF CONTROLLING THE SAME

(71) Applicant: Kabushiki Kaisha Toshiba, Minato-ku (JP)

(72) Inventors: Kiyoshi Kusunoki, Kawasaki (JP); Yuichi Shiozaki, Tokyo (JP); Teruyuki Ishizuki, Tokyo (JP); Tadahiro Yanagisawa, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 438 days.

(21) Appl. No.: 14/136,065

(22) Filed: Dec. 20, 2013

(65) Prior Publication Data

US 2014/0197638 A1    Jul. 17, 2014

(30) Foreign Application Priority Data

Jan. 11, 2013 (JP) .................................. 2013-004108
Nov. 15, 2013 (JP) .................................. 2013-237287

(51) Int. Cl.
*F03B 15/02* (2006.01)
*F03B 13/10* (2006.01)
*H02P 9/00* (2006.01)
*H02P 9/04* (2006.01)

(52) U.S. Cl.
CPC .............. *F03B 15/02* (2013.01); *F03B 13/10* (2013.01); *H02P 9/007* (2013.01); *H02P 9/04* (2013.01)

(58) Field of Classification Search
CPC ........ F03B 15/02; F03B 13/10; H02P 9/007; H02P 9/04
See application file for complete search history.

(56) References Cited

U.S. PATENT DOCUMENTS

| 4,920,277 | A | 4/1990 | Kuwabara et al. |
| 5,742,515 | A | 4/1998 | Runkle et al. |
| 2009/0302607 | A1 | 12/2009 | Kenzaki et al. |

FOREIGN PATENT DOCUMENTS

| EP | 0 303 170 A2 | 2/1989 |
| EP | 0 303 170 A3 | 2/1989 |
| EP | 0 739 087 A2 | 10/1996 |
| EP | 0 739 087 A3 | 10/1996 |
| EP | 2 133 987 A2 | 12/2009 |
| EP | 2 133 987 A3 | 12/2009 |
| JP | 63-178795 | 7/1988 |

OTHER PUBLICATIONS

Extended European Search Report issued Jul. 31, 2014 in Patent Application No. 13199241.4.

*Primary Examiner* — Sean Shechtman
*Assistant Examiner* — Derrick Boateng
(74) *Attorney, Agent, or Firm* — Oblon, McClelland, Maier & Neustadt, L.L.P

(57) ABSTRACT

In one embodiment, a control system of a variable speed pumped storage hydropower system includes an optimization processing unit configured to calculate a flow rate adjusting valve opening demand value and a first command value, a speed control unit configured to generate a secondary current active power component command value of a secondary excitation device based on the first command value, a mechanical (pump-turbine) output compensation unit configured to calculate a compensation value of the opening of the flow rate adjusting valve and/or a compensation value of the generator-motor output, and an output control unit configured to generate a flow rate adjusting valve opening command value based on the generator-motor output command value, the flow rate adjusting valve opening demand value, the compensation value calculated by the mechanical output compensation unit, and the output detection value of the generator-motor.

10 Claims, 18 Drawing Sheets

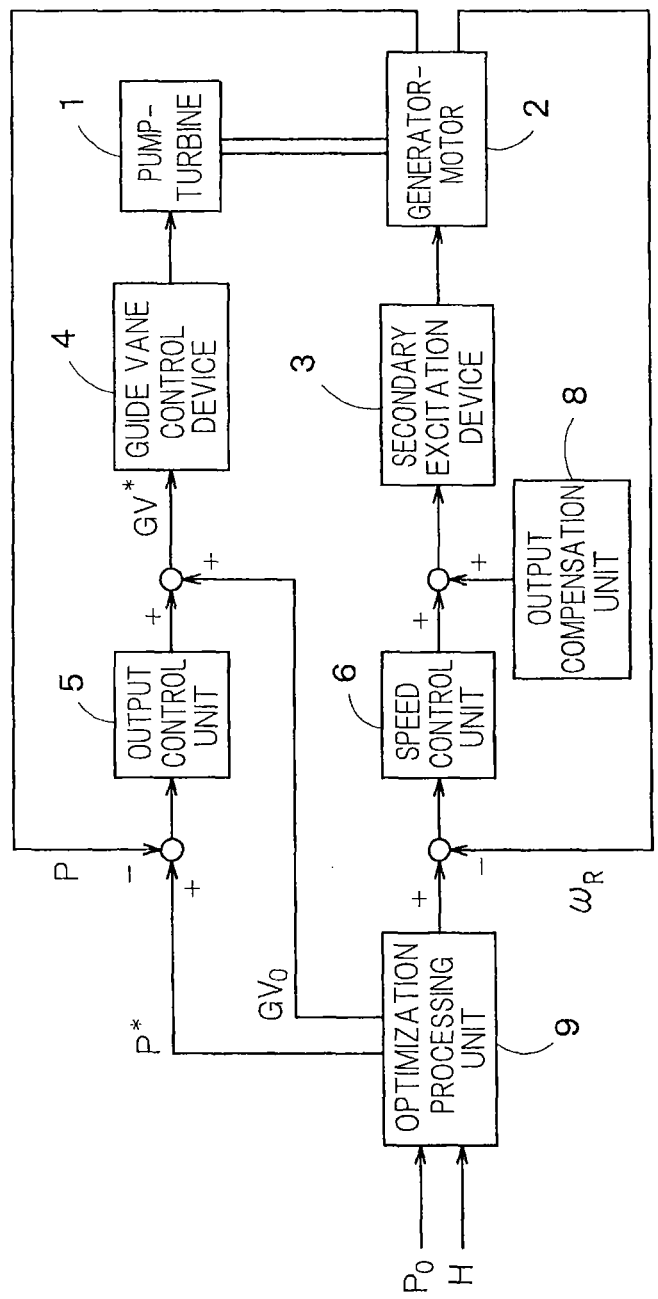
F I G. 1A

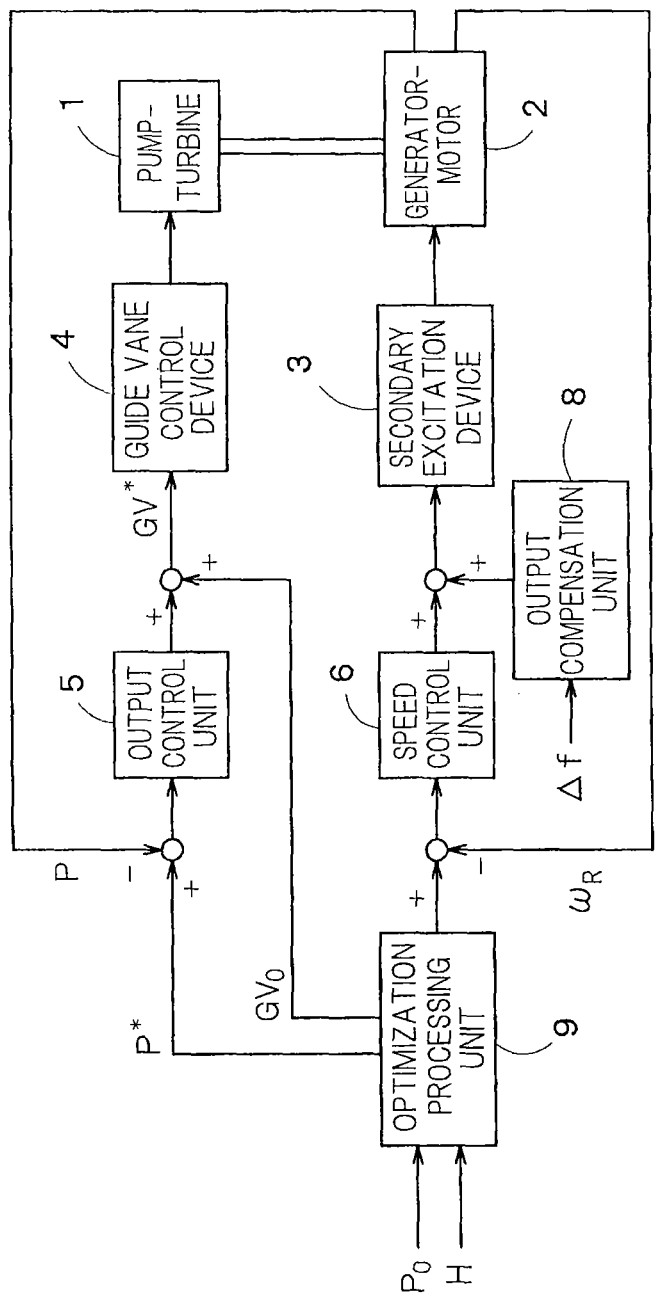
F I G. 1B

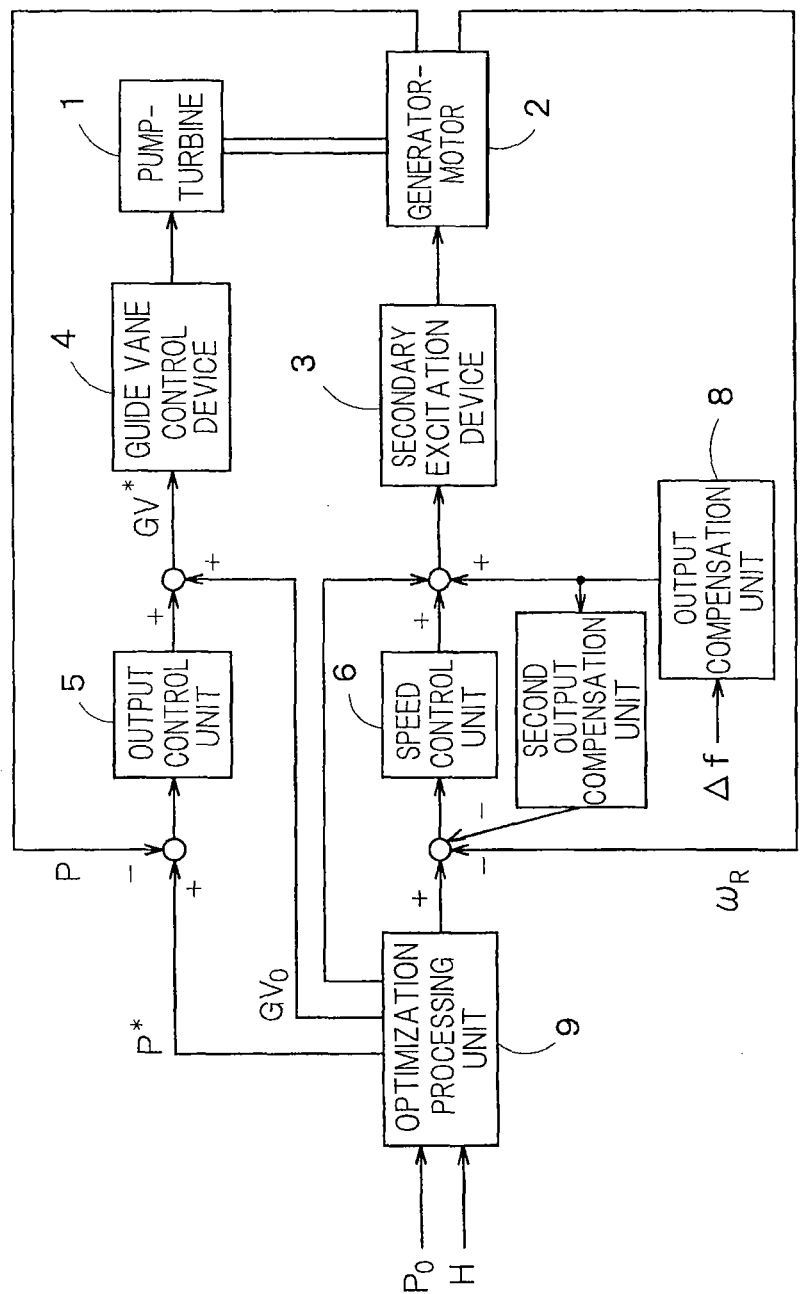
F I G. 1D

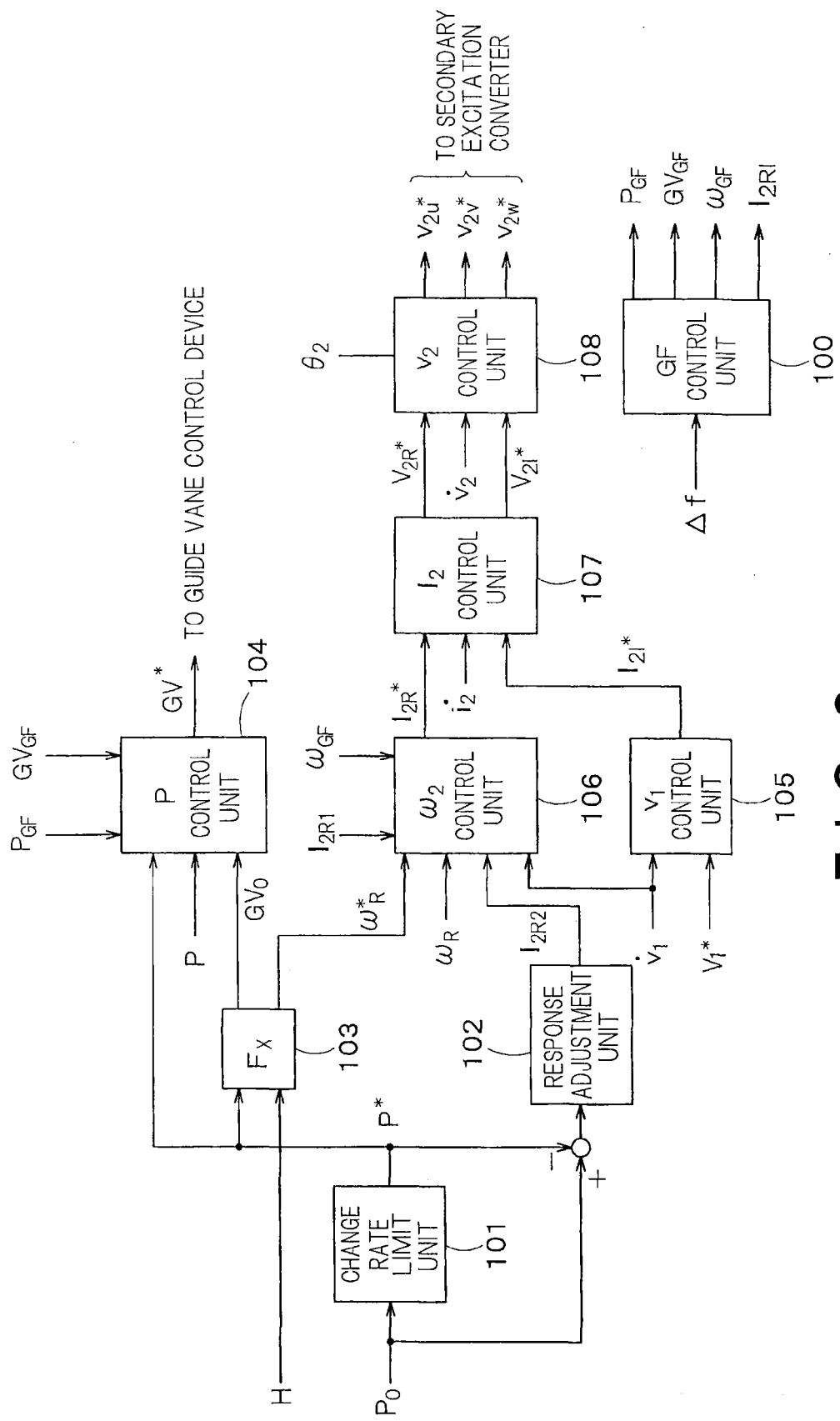
F I G. 2

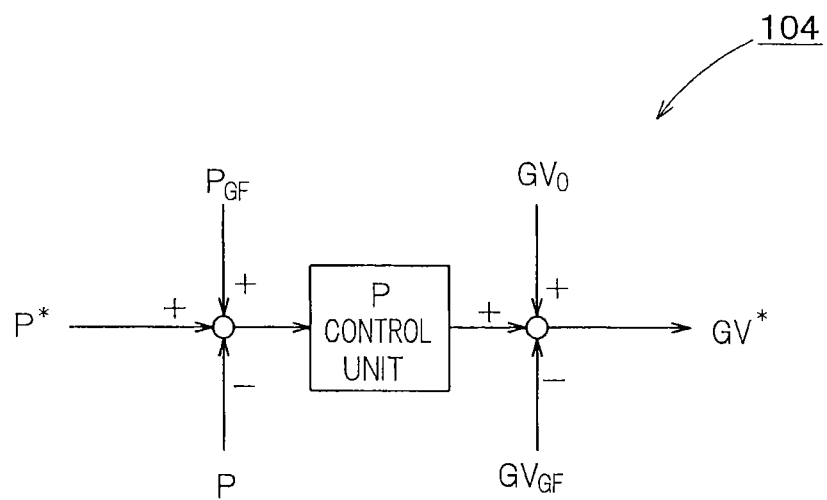
F I G. 3

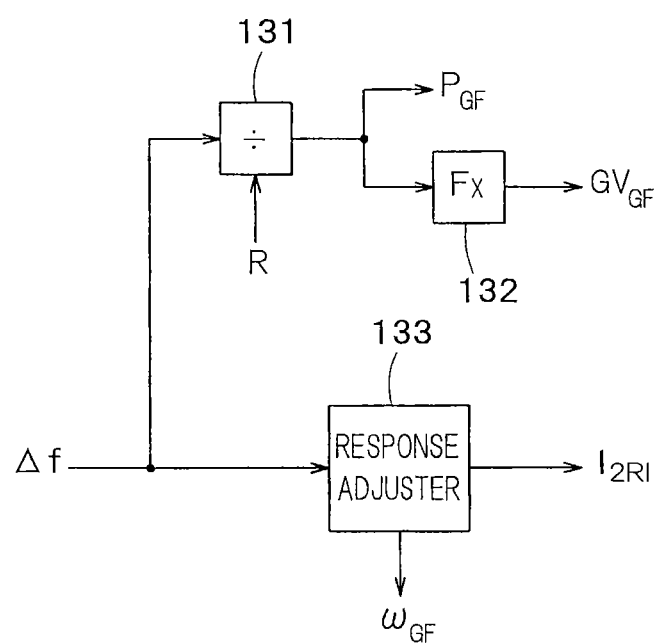
F I G. 5

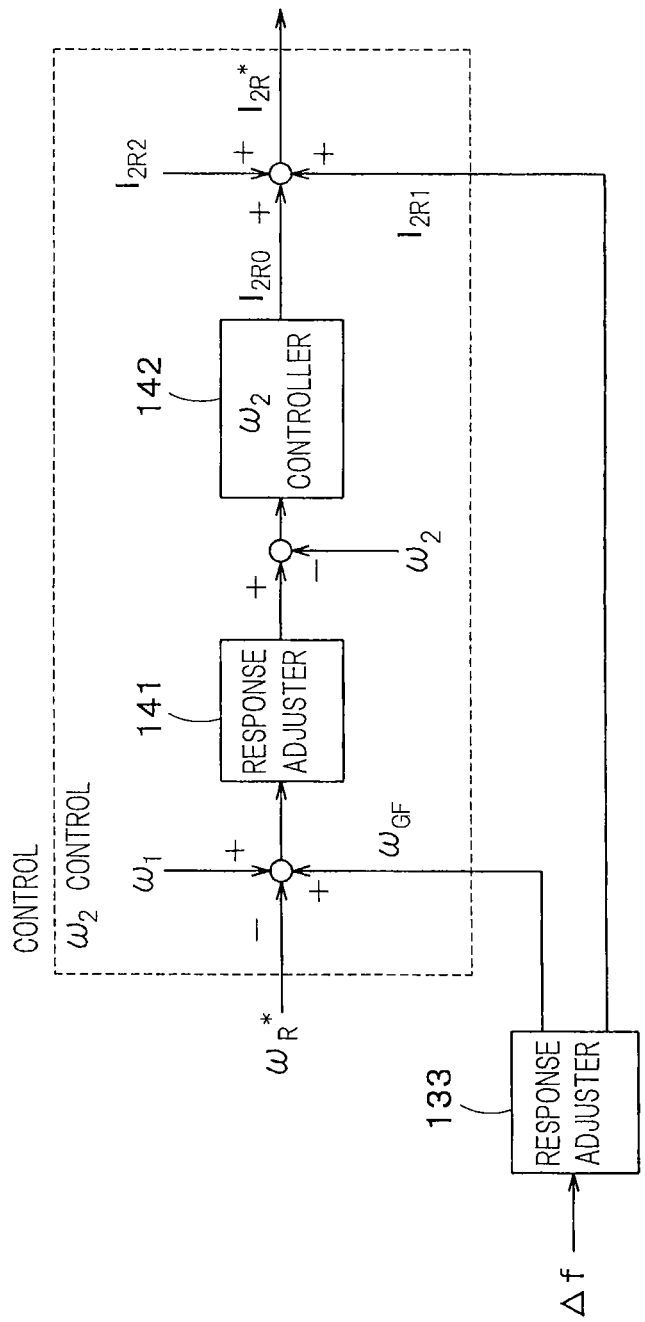
F I G. 6

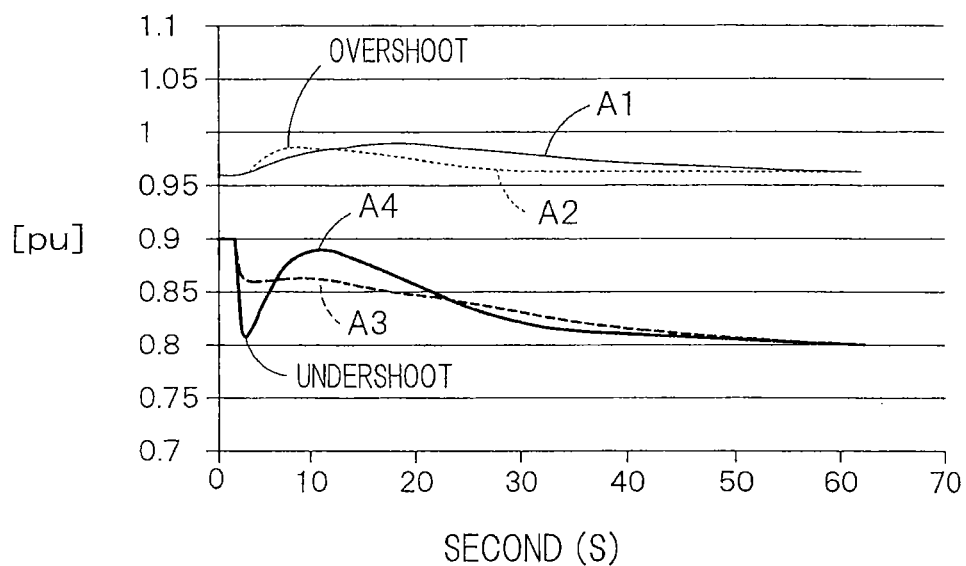
F I G. 7
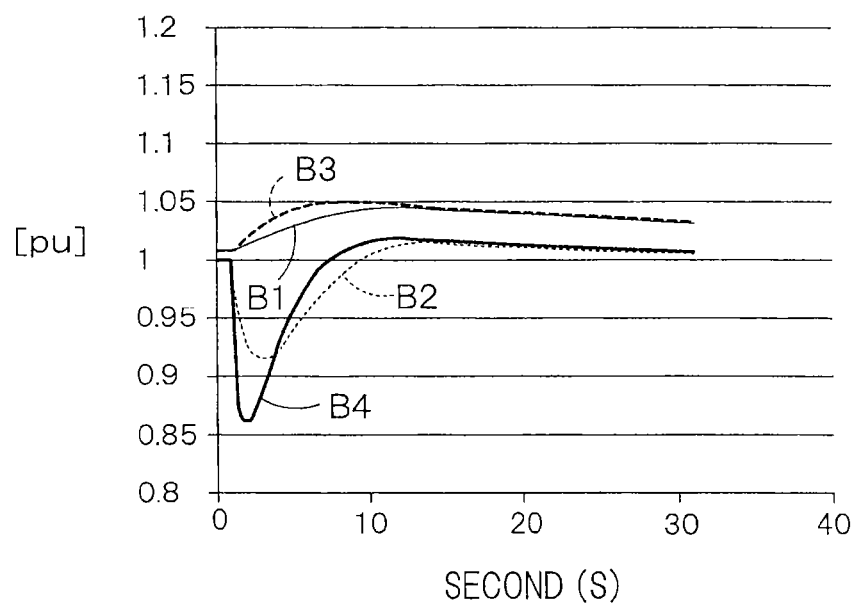
F I G. 8

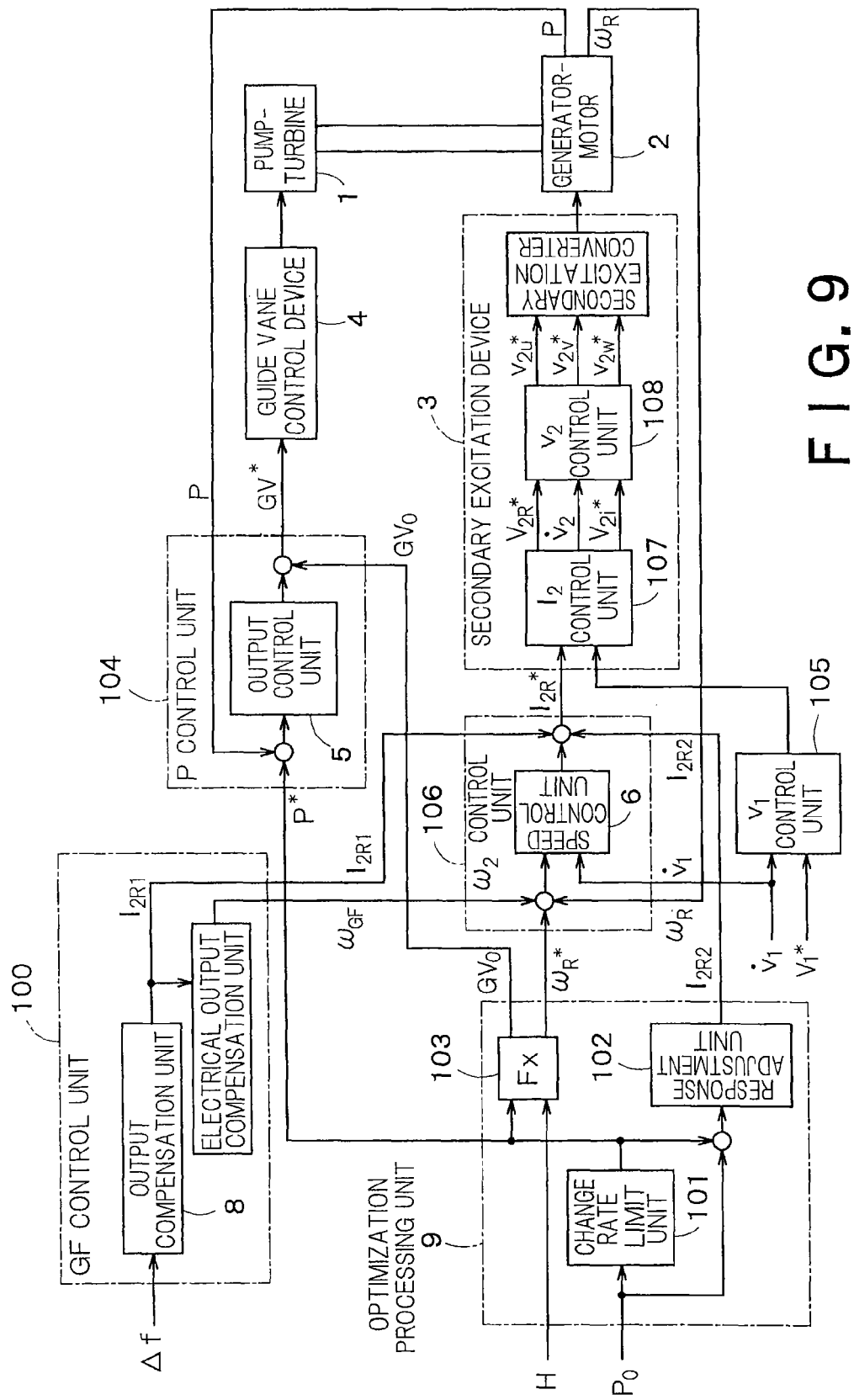
F I G. 9

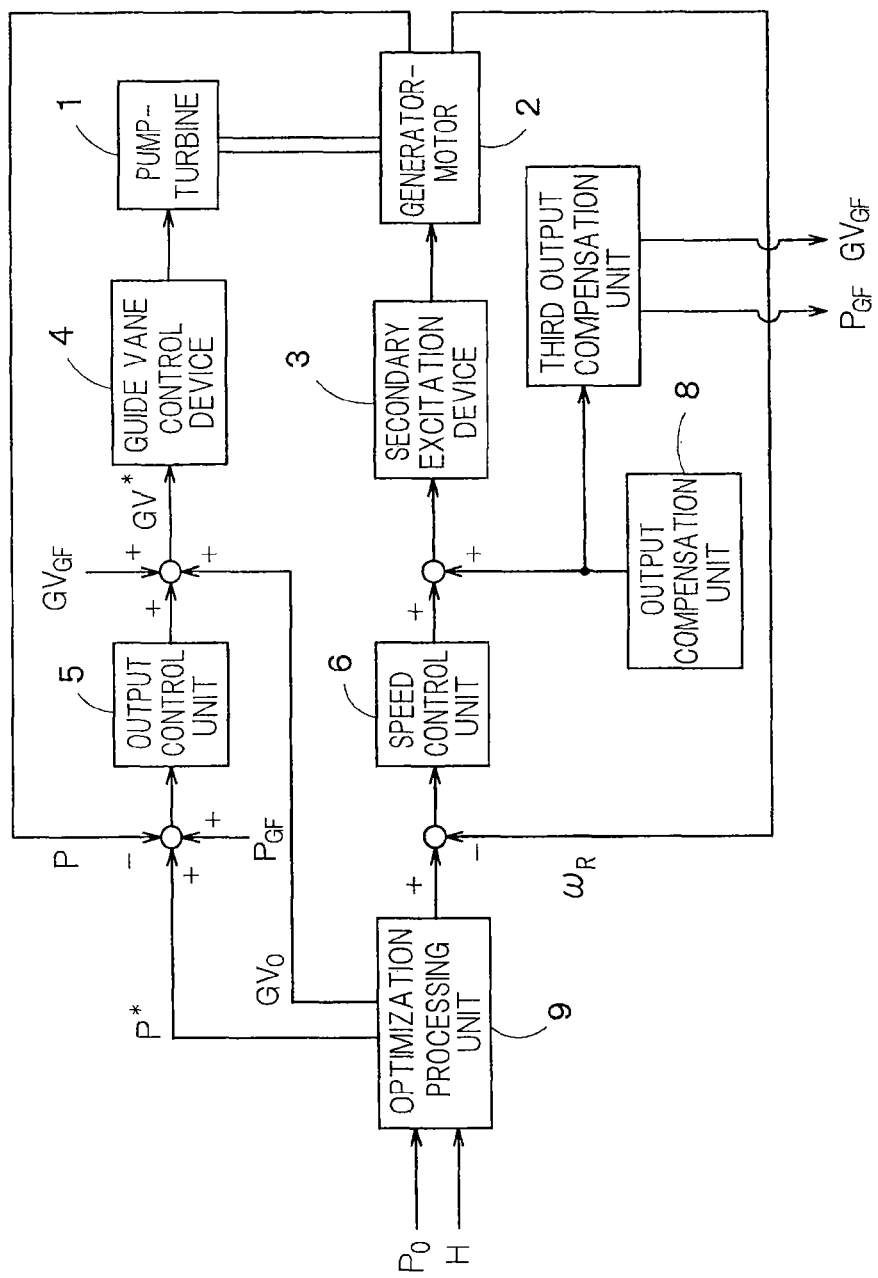
F I G. 10A

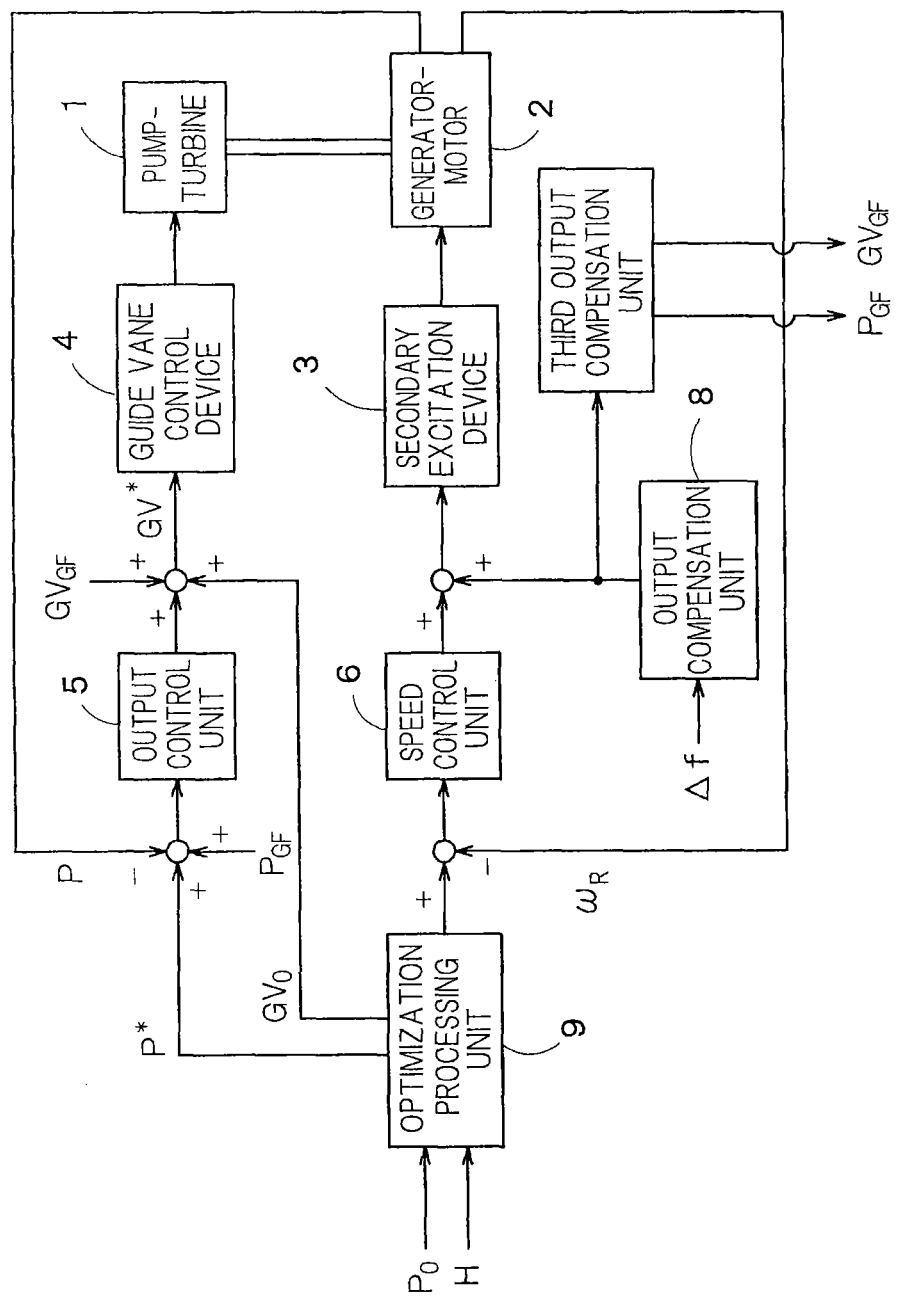
F I G. 10B

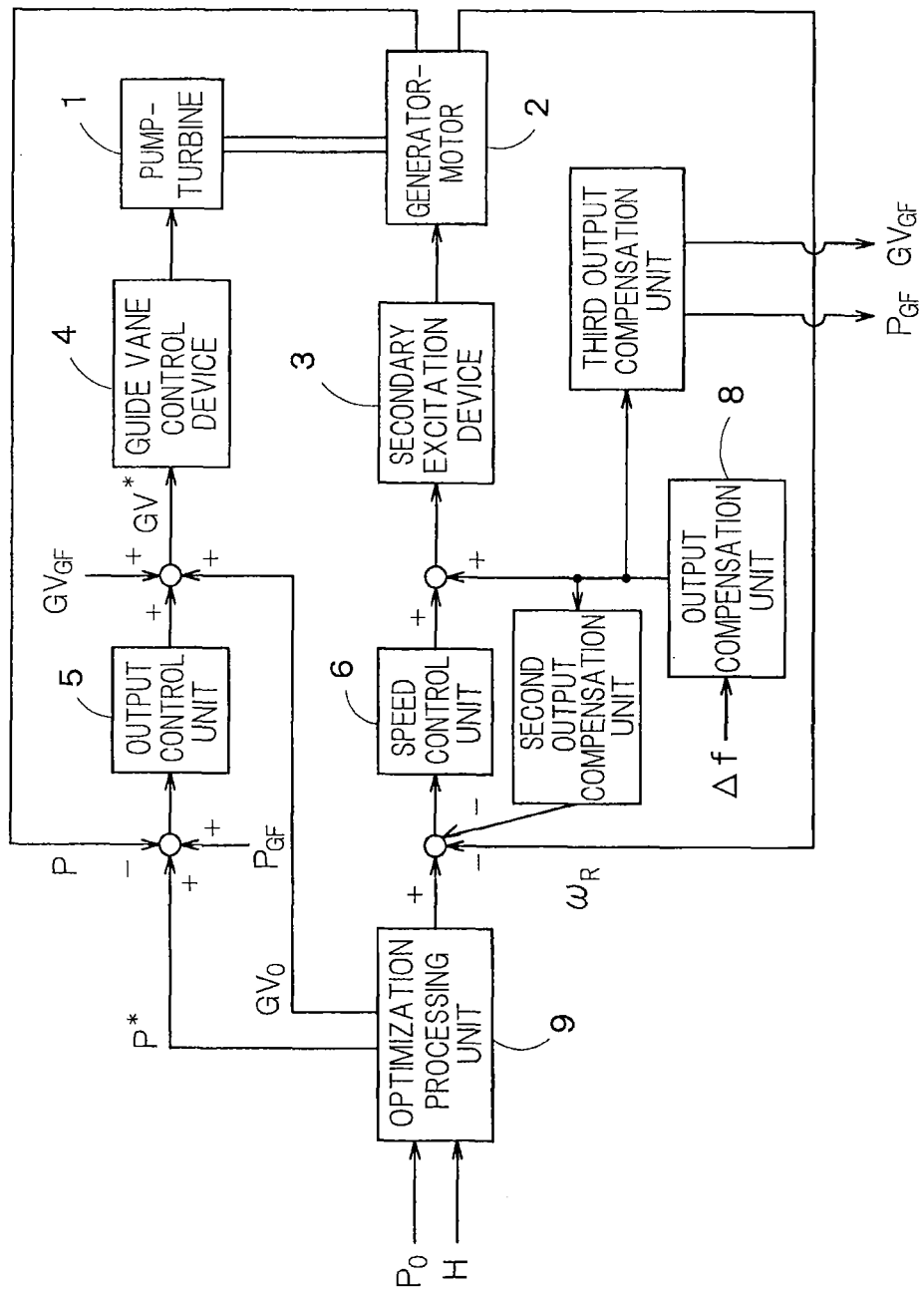
F I G. 10C

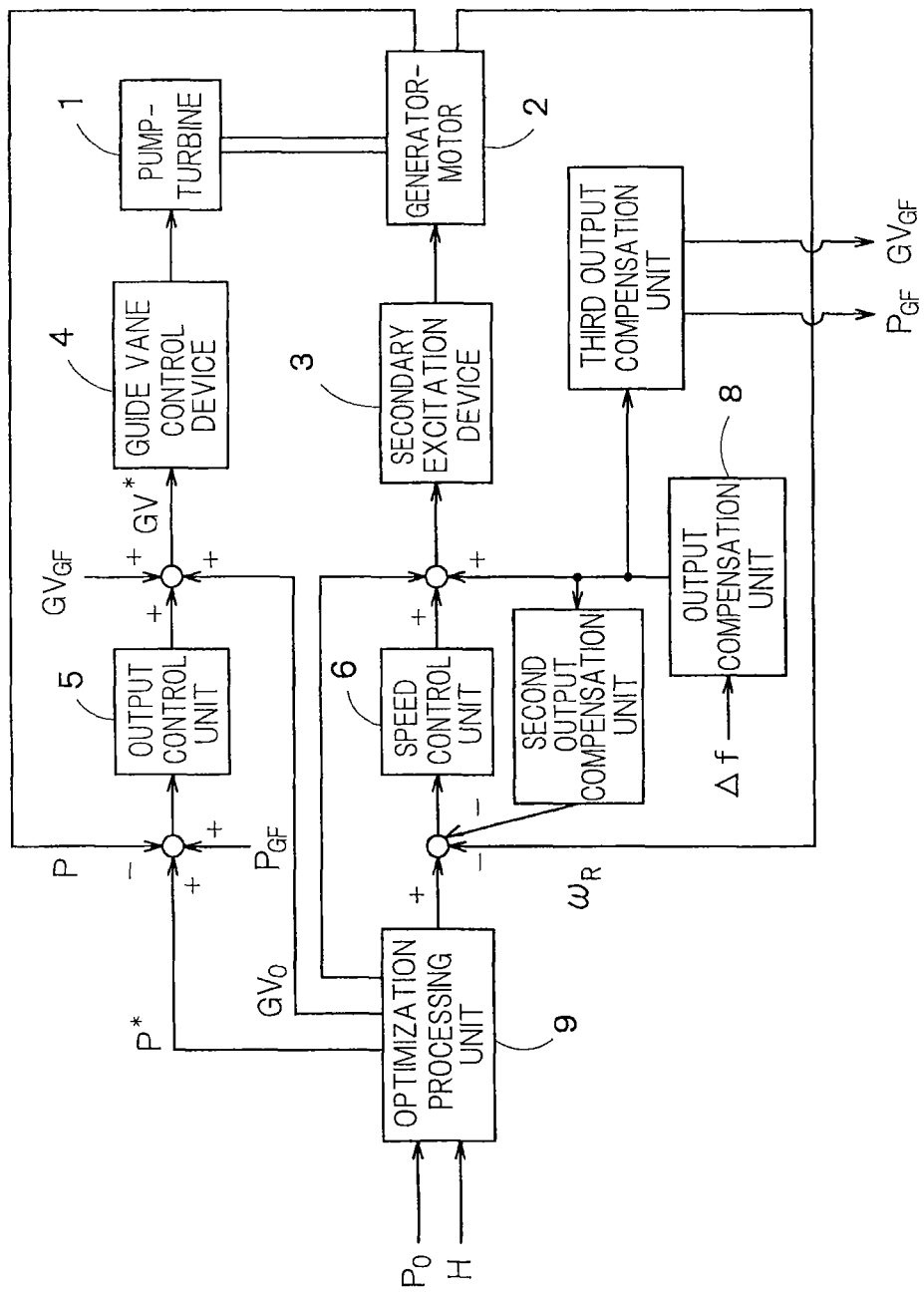
F I G. 10D

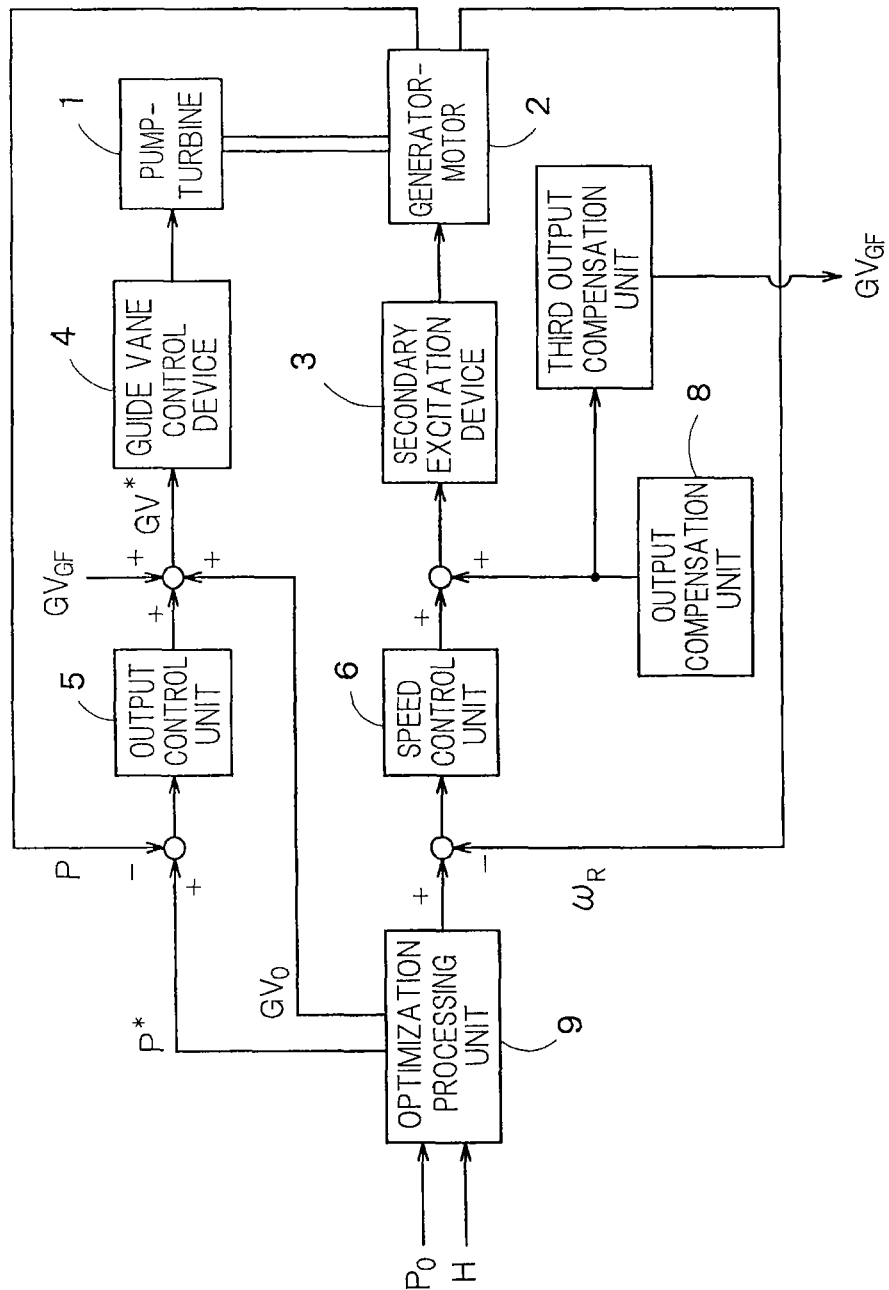
F I G. 12

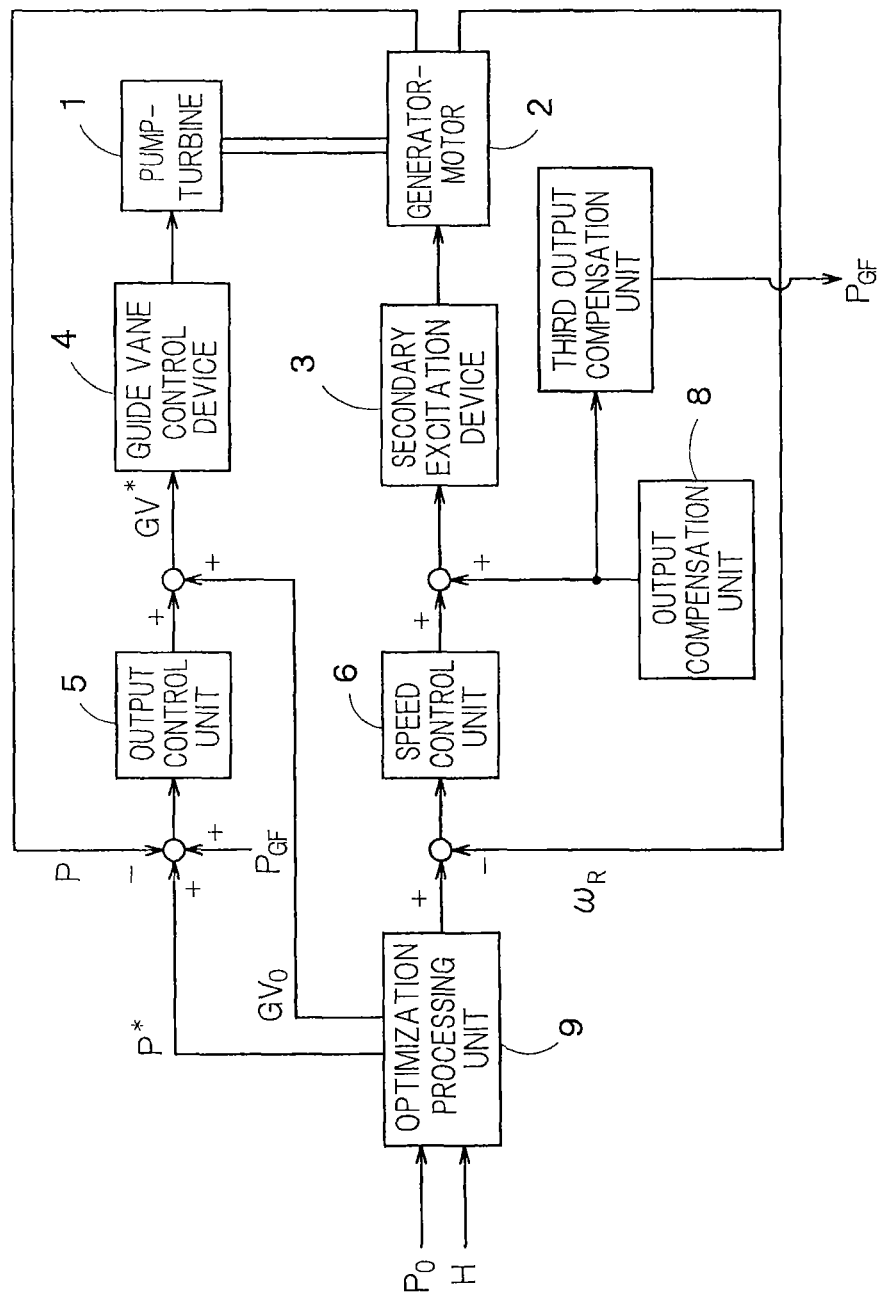
F I G. 13

CONTROL SYSTEM OF VARIABLE SPEED PUMPED STORAGE HYDROPOWER SYSTEM AND METHOD OF CONTROLLING THE SAME

CROSS REFERENCE TO RELATED APPLICATIONS

This application is based upon and claims benefit of priority from the Japanese Patent Application No. 2013-4108, filed on Jan. 11, 2013, and the Japanese Patent Application No. 2013-237287, filed on Nov. 15, 2013, the entire contents of which are incorporated herein by reference.

FIELD

Embodiments described herein relate generally to a control system of a variable speed pumped storage hydropower system and a method of controlling the same.

BACKGROUND

When supply-demand imbalance is caused in a power system, a power system frequency is changed. A generator-motor in the power system increases or decreases an output (active power) according to a detected frequency change width, and suppresses the power system frequency change. In a case of a synchronous generator-motor, if a pump-turbine output is not changed, a generator-motor output is not changed. Therefore, a response speed of the generator-motor output is subject to an influence of a response speed of the pump-turbine output, and the generator-motor output cannot be controlled quickly. Meanwhile, a variable speed pumped storage hydropower system using a doubly-fed generator-motor can control a generator-motor output quickly regardless of a pump-turbine output by using rotational energy. The variable speed pumped storage hydropower system has a great advantage of higher-speed control of a generator-motor output than a synchronous generator-motor.

A rotational speed of the pump-turbine in the variable speed pumped storage hydropower system is controlled at an optimal rotational speed according to a head and an output in order to operate the pump-turbine at a high efficiency point. The variable speed pumped storage hydropower system also has a great advantage of higher system efficiency than a constant speed pumped storage hydropower system and of effective use of water.

A rotational speed change of the generator-motor of the variable speed pumped storage hydropower system is determined by a difference between a generator-motor output and a pump-turbine output. The larger difference between the generator-motor output and the pump-turbine output causes the larger rotational speed change, and the larger difference from the optimal rotational speed.

A conventional control system uses a generator-motor output change amount, which is to be changed quickly, for compensating the demand value of a rotational speed. When the generator-motor output is increased, the generator-motor rotational energy is converted into the output by compensating the rotational speed demand value to be lower. From the viewpoint of efficiency of the pump-turbine, it is desirable to increase the rotational speed when the generator-motor output is increased. However, in the conventional control system, when the generator-motor output is increased, the difference between the generator-motor output and the pump-turbine output becomes larger, and the rotational speed is decreased. There is a drawback of excessive control of the generator-motor output and the rotational speed generator-motor (an overshoot occurs in the generator-motor output and an undershoot occurs in the rotational speed) because of feedback of the generator-motor output and correction of the rotational speed demand value. There is also a drawback of a decrease in pump-turbine efficiency due to a decrease in rotational speed.

Meanwhile, when the output of the generator-motor is decreased, the generator-motor output is converted into rotational energy and the output is decreased quickly by compensating the rotational speed demand value higher. From the viewpoint of efficiency of the pump-turbine, it is desirable to decrease the rotational speed when the generator-motor output is decreased. However, in the conventional control system, when the generator-motor output is decreased, the difference between the generator-motor output and the pump-turbine output becomes larger, and the rotational speed is increased. There is a drawback of excessive control of the generator-motor output and the rotational speed generator-motor (an undershoot occurs in the generator-motor output and an overshoot occurs in the rotational speed) because of feedback of the generator-motor output and correction of the rotational speed demand value. There is also a drawback of a decrease in pump-turbine efficiency due to an increase in rotational speed.

BRIEF DESCRIPTION OF THE DRAWINGS

FIG. 1A is a diagram illustrating an example (Part 1) of a schematic configuration of a variable speed pumped storage hydropower system according to First Embodiment;

FIG. 1B is a diagram illustrating an example (Part 2) of the schematic configuration of the variable speed pumped storage hydropower system according to First Embodiment;

FIG. 1D is a diagram illustrating an example (Part 4) of the schematic configuration of the variable speed pumped storage hydropower system according to First Embodiment;

FIG. 2 is a block diagram illustrating a configuration of main functions of a control system included in the variable speed pumped storage hydropower system of FIGS. 1A to 1D;

FIG. 3 is a block diagram illustrating a configuration of a P control unit included in the control system of FIG. 2;

FIG. 5 is a block diagram illustrating a configuration of a GF control unit 100 included in the control system of FIG. 2;

FIG. 6 is a diagram illustrating an example of a configuration related to $\omega_2$ control according to Third Embodiment;

FIG. 7 is a diagram illustrating a relationship between a generator power change and a speed change according to a system of an embodiment by contrasting the embodiment and a conventional technology;

FIG. 8 is a diagram illustrating an example of a generator power change and a speed change when a change amount immediately after a frequency change by a system of the embodiment is increased, and an example of a generator power change and a speed change when a time to maintain a generator power change is increased;

FIG. 9 is a detailed diagram of the variable speed pumped storage hydropower system of FIG. 1D;

FIG. 10A is a diagram illustrating an example (Part 1) of a schematic configuration of a variable speed pumped storage hydropower system according to Modification;

FIG. 10B is a diagram illustrating an example (Part 2) of the schematic configuration of the variable speed pumped storage hydropower system according to Modification;

FIG. 10C is a diagram illustrating an example (Part 3) of the schematic configuration of the variable speed pumped storage hydropower system according to Modification;

FIG. 10D is a diagram illustrating an example (Part 4) of the schematic configuration of the variable speed pumped storage hydropower system according to Modification;

FIG. 12 is an example (Part 5) of the schematic configuration of the variable speed pumped storage hydropower system according to Modification; and FIG. 13 is a diagram illustrating an example (Part 6) of the schematic configuration of the variable speed pumped storage hydropower system according to Modification.

DETAILED DESCRIPTION

Figure 1C:
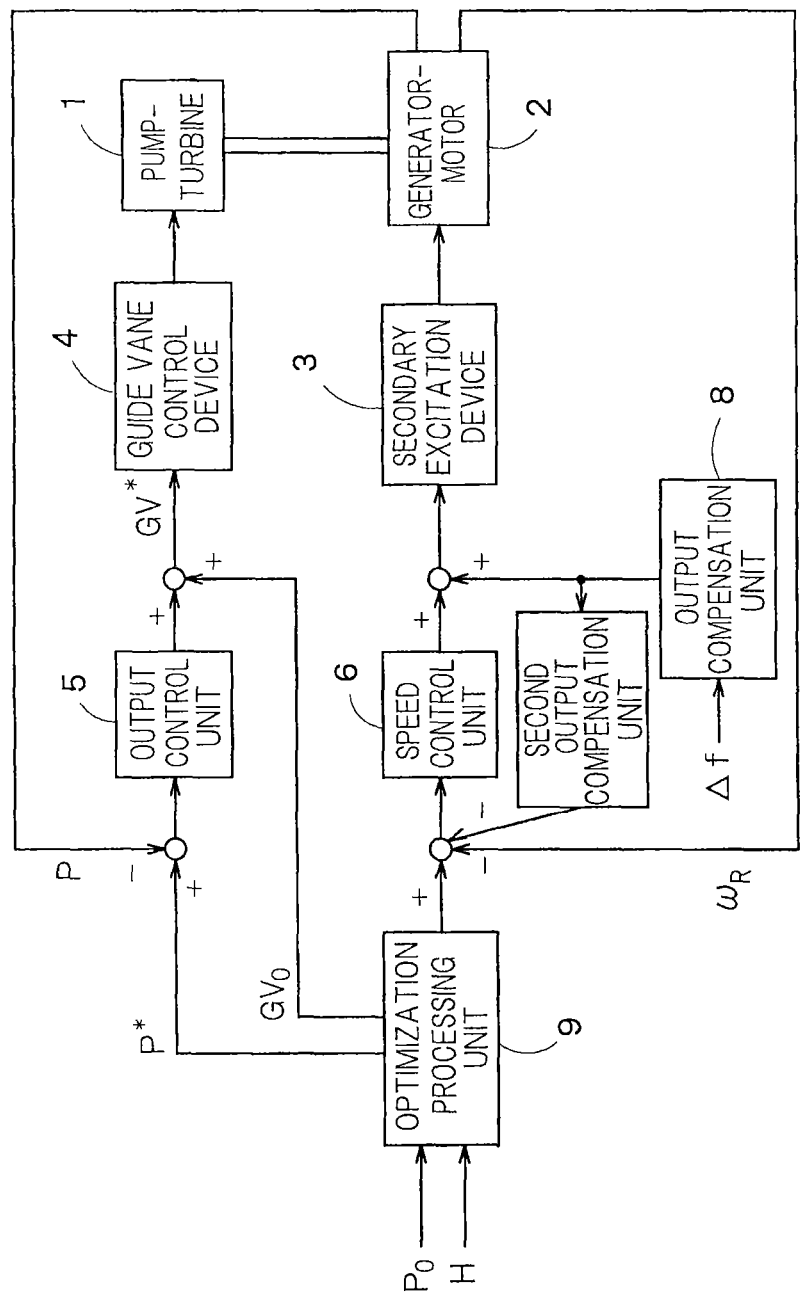
FIG. 1C is a diagram illustrating an example (Part 3) of the schematic configuration of the variable speed pumped storage hydropower system according to First Embodiment.

In one embodiment, a control system of a variable speed pumped storage hydropower system includes a secondary excitation device configured to apply a current to a secondary winding of a generator-motor, a flow rate adjusting valve control unit configured to control an opening of a flow rate adjusting valve that adjusts a flow rate of a pump-turbine connected with the generator-motor, an optimization processing unit configured to generate a generator-motor output command value based on a demanded generator-motor output, and to calculate and output a flow rate adjusting valve opening demand value and a first command value from a head value and the generator-motor output command value, a speed control unit configured to generate a secondary current active power component command value of the secondary excitation device based on the first command value, an output compensation unit configured to calculate a compensation value of the secondary current active power component command value, a mechanical output compensation unit configured to input an output of the output compensation unit, and to calculate at least either a compensation value of the opening of the flow rate adjusting valve or a compensation value of the generator-motor output, and an output control unit configured to generate a flow rate adjusting valve opening command value based on the generator-motor output command value, the flow rate adjusting valve opening demand value, the compensation value calculated by the mechanical output compensation unit, and the output detection value of the generator-motor, and to output the flow rate adjusting valve opening command value to the flow rate adjusting valve control unit. The first command value includes a slip command value, a rotational speed command value, an angular velocity command value, or a secondary frequency command value.

Hereinafter, embodiments will be described with reference to the drawings.

(First Embodiment)

First Embodiment will be described with reference to FIGS. 1A to 1D, 2 to 5, and 9.

FIGS. 1A to 1D are diagrams illustrating examples (Part 1 to Part 4) of a schematic configuration of a variable speed pumped storage hydropower system according to First Embodiment. FIG. 9 is a detailed configuration diagram of the variable speed pumped storage hydropower system illustrated in FIG. 1D.

The variable speed pumped storage hydropower system is a system capable of operating a generator-motor at an asynchronous speed, and includes a pump-turbine 1 connected with a generator-motor 2, the generator-motor 2, a secondary excitation device 3 that applies a current to secondary windings of the generator-motor 2, a guide vane control device 4 that controls an opening of guide vanes that control a flow rate of the pump-turbine 1, an output control unit 5 that generates a guide vane opening command value GV* based on a deviation of a generator-motor output detection value P obtained from the generator-motor 2 and a generator-motor output command value P*, a speed control unit 6 that generates a generator-motor secondary voltage active power component command value based on a deviation of an angular velocity $\omega_R$ obtained from the generator-motor 2 and an angular velocity command value, an output compensation unit 8 that calculates a compensation value of the secondary current active power component command value, and an optimization processing unit 9 that calculates and output a guide vane opening demand value (flow rate adjusting valve opening demand value) $GV_0$ and a slip command value from a head value H and a generator-motor output demand value $P_0$. Here, a relationship among "slip", a "rotational speed (r/s)", and a "frequency" can be expressed by the following expression:

Slip=(Synchronous speed−Rotational speed)/Synchronous speed =(Power System frequency−(Rotational speed×The number of poles/2))/Power System frequency =Secondary frequency/Power System frequency     (Expression 1)

Note that the optimization processing unit 9 generates one obtained by applying change rate limit to the generator-motor output demand value $P_0$ as a generator-motor output command value P*. Further, as described below, the optimization processing unit 9 includes a slip control unit ($\omega_2$ control unit 106) that generates a secondary current active power component command value ($I_{2R}^*$) of the secondary excitation device 3. The secondary excitation device 3 is configured from a secondary current control unit ($I_2$ control unit 107), a secondary voltage control unit ($v_2$ control unit 108), and the like.

As described above, the present embodiment uses an output of the output compensation unit 8 as a compensation signal of the secondary current active power component command value ($I_{2R}^*$).

Note that the variable speed pumped storage hydropower system also includes one or a plurality of control devices that realizes various control functions not illustrated in FIGS. 1A to 1D.

In the examples of FIGS. 1A to 1D, the guide vane control device 4 that controls the opening of the guide vanes is exemplarily illustrated. However other types of flow adjusting valve may be used instead of guide vanes, it is desirable to include a flow rate adjusting valve control device that controls the opening of a flow rate adjusting valve that adjusts the flow rate of the pump-turbine 1 connected with the generator-motor 2 in the guide vane control device 4 in case of using other types of flow adjusting valve. In this case, the output control unit 5 generates a guide vane opening command value GV* as a flow rate adjusting valve opening command value, and sends the value to the flow rate adjusting valve control device.

For example, like FIG. 1B, the output compensation unit 8 may calculate a compensation value of a secondary current active power component command value from a power system frequency deviation Δf. In this case, the output compensation unit 8 converts the power system frequency deviation Δf into a generator-motor output value, and obtains a generator-motor output change amount to be used for a quick response. Note that it is not indispensable to use the power system frequency deviation Δf. The generator-motor output change amount may be obtained from other information (see FIG. 1A). Note that, when the change amount immediately after the frequency change is increased in view of responses of other generator-motors, or when the time to maintain the generator-motor output change to be used for a quick response is increased, required response is different depending on the characteristics of a power system. Therefore, the compensation value of the generator-motor secondary current active power component is obtained through the response adjustment function in order to deal with such situations.

In addition, like FIG. 1C, a second output compensation unit (electrical output compensation unit) that inputs an output of the output compensation unit 8, calculates a compensation value of a slip command value, and outputs the compensation value of the slip command value to the slip control unit may be included.

In addition, like FIG. 1D, the optimization processing unit 9 may include a quick response component extraction unit (not illustrated) that extracts a quick response component (active power current quick response compensation value $I_{2R2}$ described below) from a demanded generator-motor output change amount and outputs the quick response component to the speed control unit 6.

Note that, while, in the examples of FIGS. 1A to 1D, an arithmetic unit that performs subtraction processing is arranged at a preceding stage of the output control unit 5, this arithmetic unit may be arranged in the output control unit 5. Due to this arrangement, the generator-motor output detection value P may be taken in to the output control unit 5.

Similarly, while, an arithmetic unit that performs addition processing is arranged at a succeeding stage of the output control unit 5, this arithmetic unit may be arranged in the output control unit 5. Due to this arrangement, the guide vane opening demand value $GV_0$ obtained from the optimization processing unit 9 may be taken in to the output control unit 5.

In addition, while an arithmetic unit that performs subtraction processing is arranged at a preceding stage of the speed control unit 6, the arithmetic unit may be arranged in the speed control unit 6. Due to this arrangement, the angular velocity $\omega_R$ obtained from the generator-motor 2 may be taken in to the speed control unit 6.

Similarly, while an arithmetic unit that performs addition processing is arranged at a succeeding stage of the speed control unit 6, the arithmetic unit may be arranged in the speed control unit 6. Due to this arrangement, a compensation signal output from the output compensation unit 8 and a fast component output from the optimization processing unit 9 may be taken in to the speed control unit 6.

FIG. 2 is a block diagram illustrating a configuration of main functions of a control system included in the variable speed pumped storage hydropower system of FIGS. 1A to 1D.

The control system of the variable speed pumped storage hydropower system includes a GF control unit (governor-free control unit) 100, a change rate limit unit 101, a response adjustment unit 102, a function generation unit (Fx) 103, a P control unit (active power control unit) 104, a $V_1$ control unit (generator-motor primary voltage amplitude control unit) 105, a $\omega_2$ control unit (generator-motor secondary voltage angular velocity control unit) 106, an $I_2$ control unit (generator-motor secondary current control unit) 107, a $v_2$ control unit (generator-motor secondary voltage control unit) 108, and the like.

All or a part of the functions of the change rate limit unit 101, the response adjustment unit 102, and the function generation unit 103 is provided, for example, in the optimization processing unit 9 in FIGS. 1A to 1D. The P control unit 104 is included in the output control unit 5 in FIGS. 1A to 1D. All or a part of the functions of the $V_1$ control unit 105 and the $\omega_2$ control unit 106 is included, for example, in the speed control unit 6 in FIGS. 1A to 1D. The GF control unit 100 is included, for example, in the output compensation unit 8 of FIGS. 1A to 1D.

The GF control unit 100 generates a generator-motor output governor-free compensation value $P_{GF}$, a guide vane opening governor-free compensation value $GV_{GF}$, an angular velocity governor-free compensation value $\omega_{GF}$, and an active power current governor-free compensation value $I_{2R1}$ based on the power system frequency deviation Δf.

The change rate limit unit 101 applies change rate limit to the generator-motor output demand value $P_0$, and outputs a result as a generator-motor output command value $P^*$.

The response adjustment unit 102 generates active power current quick response compensation value $I_{2R2}$ suitable for active power current quick response compensation in the $\omega_2$ control unit 106 based on a deviation of the generator-motor output demand value $P_0$ and the generator-motor output command value $P^*$.

The function generation unit 103 generates a guide vane opening demand value $GV_0$ as well as an angular velocity command value $\omega_R^*$ based on the generator-motor output command value $P^*$ and the head value H.

The P control unit 104 takes in the generator-motor output governor-free compensation value $P_{GF}$ and the guide vane opening governor-free compensation value $GV_{GF}$ generated by the GF control unit 100, and generates a guide vane opening command value $GV^*$ based on these value, the generator-motor output command value $P^*$, the generator-motor output detection value P, and the guide vane opening demand value $GV_0$.

The $V_1$ control unit 105 generates a reactive power current command value $I_{2I}^*$ based on the generator-motor primary voltage amplitude command value $V_1^*$ and the generator-motor primary voltage $\dot{v}_1$.

The $\omega_2$ control unit 106 takes in the active power current governor-free compensation value $I_{2R1}$ and the angular velocity governor-free compensation value $\omega_{GF}$ generated by the GF control unit 100, and generates a generator-motor secondary current active power component command value $I_{2R}^*$ based on these values, the angular velocity command value $\omega_R^*$, the angular velocity $\omega_R$, and the active power current quick response compensation value $I_{2R2}$.

The $I_2$ control unit 107 generates a generator-motor secondary voltage active power component command value $V_{2R}^*$ and the generator-motor secondary voltage reactive power component command value $V_{2I}^*$ based on the generator-motor secondary current active power component command value $I_{2R}^*$, the reactive power current command value $I_{2I}^*$, and the generator-motor secondary current $I_2^*$.

The $v_2$ control unit 108 generates generator-motor secondary voltage command values $v_{2U}^*$, $v_{2V}^*$, and $v_{2W}^*$ based on the generator-motor secondary voltage active power component command value $V_{2R}^*$ the generator-motor secondary voltage reactive power component command value $V_{2I}^*$, the generator-motor secondary voltage $\dot{v}_2$, and the generator-motor secondary voltage phase $\theta_2$ from the $\omega_2$ control unit 106.

FIG. 3 is a block diagram illustrating a function configuration of the P control unit 104 included in the control system of FIG. 2.

The P control unit 104 generates a signal suitable for the guide vane opening command based on the generator-motor output command value P*, and a deviation of the generator-motor output governor-free compensation value $P_{GF}$ and the generator-motor output detection value P, and generates a guide vane opening command value GV* based on the value, the guide vane opening demand value $GV_0$, and the guide vane opening governor-free compensation value $GV_{GF}$.

Figure 4:
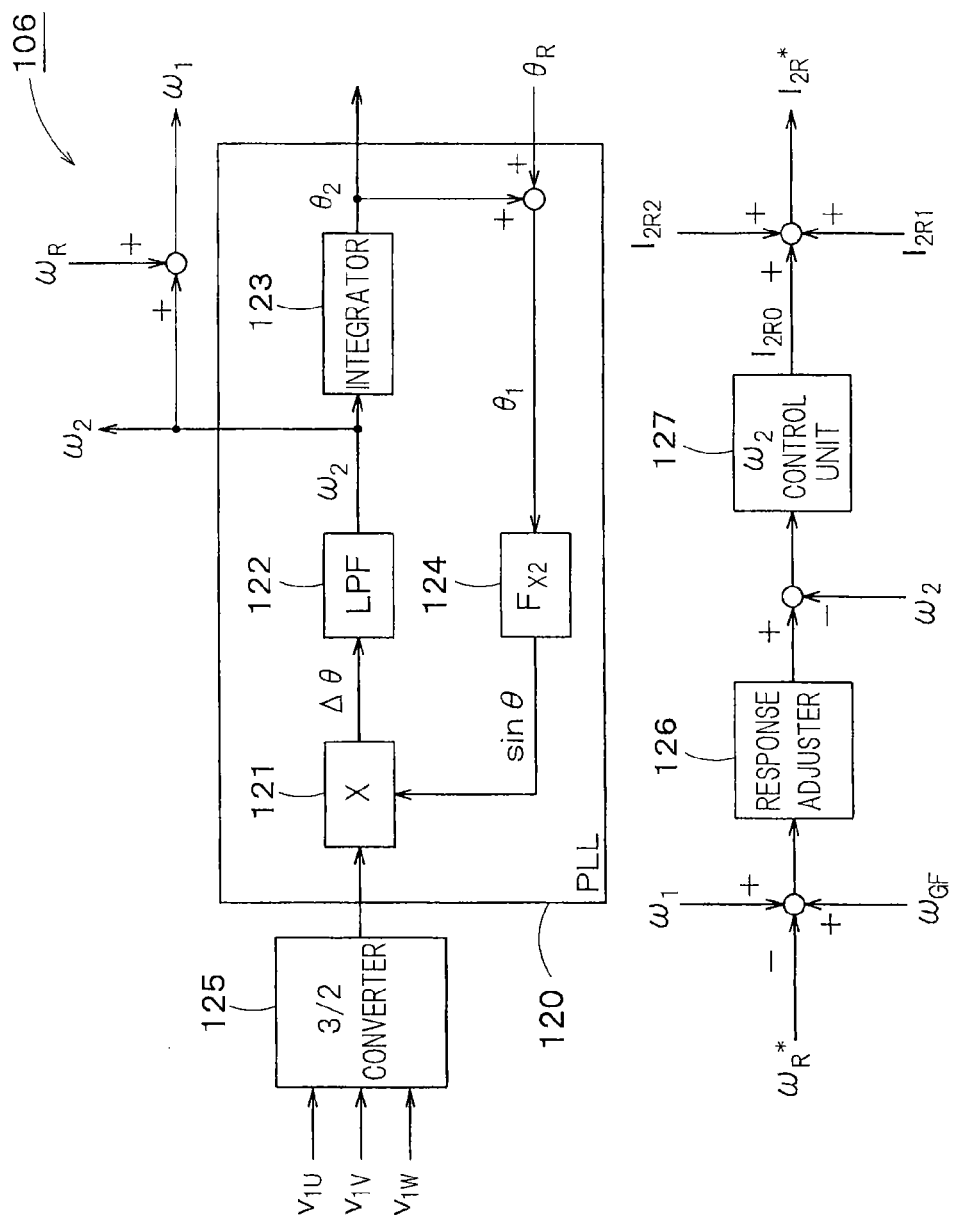
FIG. 4 is a block diagram illustrating a configuration of a $\omega_2$ control unit included in the control system of FIG. 2.

FIG. 4 is a block diagram illustrating a function configuration of the $\omega_2$ control unit 106 included in the control system of FIG. 2.

The $\omega_2$ control unit 106 includes a 3/2 (3-phase to 2-phase) converter 125 that applies 3/2 (3-phase to 2-phase) conversion processing using the generator-motor primary voltage command values $v_{1U}$, $v_{1V}$, and $v_{1W}$, and a PLL circuit 120 (including an arithmetic unit (x) 121, an LPF 122, an integrator 123, a function generation unit (Fx2) 124, and the like) that generates a generator-motor secondary voltage phase $\theta_2$ using the conversion result and the generator-motor electrical angle $\theta_R$ as well as generating a generator-motor primary voltage angular velocity $\omega_1$ from the generator-motor secondary voltage angular velocity $\omega_2$ generated in the LPF 122 and the angular velocity $\omega_R$. The generator-motor electrical angle $\theta_R$ may be a value obtained from a mechanical angle of a generator-motor rotor or a rotational speed of the generator-motor.

Further, the $\omega_2$ control unit 106 includes a response adjuster 126, a $\omega_2$ controller 127, and various arithmetic units performing subtraction processing/addition processing, generates generator-motor secondary current active power component $I_{2R0}$ in the $\omega_2$ control unit 127 based on a deviation of a value after the response adjustment and the generator-motor secondary voltage angular velocity $\omega_2$ after performing response adjustment in the response adjuster 126 based on the angular velocity governor-free compensation value $\omega_{GF}$, and a deviation of the generator-motor primary voltage angular velocity $\omega_1$ and the angular velocity command value $\omega_R{}^*$, and generates a generator-motor secondary current active power component command value $I_{2R}{}^*$ by performing addition processing of the generator-motor secondary current active power component $I_{2R0}$, the active power current governor-free compensation value $I_{2R1}$, and the active power current quick response compensation value $I_{2R2}$.

FIG. 5 is a block diagram illustrating a function configuration of the GF control unit 100 included in the control system of FIG. 2.

The GF control unit 100 includes a divider 131, a function generator (Fx) 132, a response adjuster 133, and the like, divides the power system frequency deviation Δf by a speed control factor to generate a generator-motor output governor-free compensation value $P_{GF}$, and generates a guide vane opening governor-free compensation value $GV_{GF}$ from the generator-motor output governor-free compensation value $P_{GF}$ by the function generator (Fx) 132. The power system frequency deviation Δf is subjected to response adjustment by the response adjuster 133, and an active power current governor-free compensation value $I_{2R1}$ and an angular velocity governor-free compensation value $\omega_{GF}$ are generated.

The graph of FIG. 7. illustrates a relationship between a generator-motor output change and a speed change according to the system of the present embodiment when the power system frequency is increased by contrasting the embodiment and a conventional technology. A1 indicates the speed change according to the present embodiment, and A2 indicates the speed change according to the conventional system. A3 indicates the generator-motor output change according to the present embodiment, and A4 indicates the generator-motor output change according to the conventional system. In both of the present embodiment and the conventional system, the generator-motor output is decreased and the rotational speed is increased due to an increase in power system frequency. The conventional system has added (feedback) a compensation signal to an input side of the speed control unit, an undershoot occurs in the generator-motor output (A4), and an overshoot occurs in the rotational speed (A2). Meanwhile, the present embodiment adds the compensation signal to an input side of the speed control unit (feedback), and adds the compensation signal to an output side of the speed control unit (feed-forward). Therefore, overshoots of both of the generator-motor output (A3) and the rotational speed (A1) can be suppressed.

Further, the graph of FIG. 8 illustrates an example of a generator-motor output change and a speed change when the change amount immediately after a power system frequency change by the system of the present embodiment is increased, and an example of a generator-motor output change and a speed change when the time to maintain the generator-motor output change is increased. B1 indicates an example of the generator-motor output change when the change amount immediately after the power system frequency change is increased, and B2 indicates a speed change when the change amount immediately after the frequency change is increased. B3 indicates an example of the generator-motor output change when the time to maintain the generator-motor output change is increased, and B4 indicates an example of the speed change when the time to maintain the generator-motor output change is increased.

According to the present embodiment, a difference from the optimal rotational speed can be decreased, and the rotation speed can return to the optimal rotational speed in a short time. This is because the speed command value is remained to be the optimal value, and therefore the speed command value acts to suppress a slip change (that is, to suppress a speed change) by the slip control.

(Second Embodiment)

Second Embodiment will be described with reference to the above-described FIGS. 1A to 1D, and 2 to 5. Hereinafter, description of parts common to First Embodiment is omitted.

In the present embodiment, an optimization processing unit 9 extracts a fast change component of a generator-motor output demand value $P_0$ (a difference between the generator-motor output command value P* and the generator-motor output demand value $P_0$, to which change rate limit is applied and changed), and the fast change component is used as a compensation value of a generator-motor secondary current active power component $I_{2R0}$.

Because a guide vane opening change speed in response to a fast change of the generator-motor output demand value $P_0$ is limited, a desirable effect cannot be expected, resulting in a mechanical stress or abrasion of the guide vanes or a drive mechanism thereof. Therefore, the present embodiment avoids such a situation. $I_{2R}$ having no restriction on change speed is temporarily used to compensate the situation. Note that the meaning of the response adjustment is similar to First Embodiment.

(Third Embodiment)

Third Embodiment will be described with reference to FIG. 6. Hereinafter, description of parts common to First and Second Embodiments is omitted.

FIG. 6 is a diagram illustrating an example of a circuit configuration related to $\omega_2$ control according to Third Embodiment. The circuit configuration of FIG. 6 corresponds to Modification of the circuit configuration described in the lower side of FIG. 4.

A response adjuster 141 and a $\omega_2$ controller 142 respectively correspond to the response adjuster 126 and the $\omega_2$ controller 127 of FIG. 4.

In the present embodiment, a power system frequency deviation $\Delta f$ is converted into a generator-motor output by a response adjuster 133, and obtains a generator-motor output change amount to be changed quickly. Note that, when the change amount immediately after the frequency change is increased in view of responses of other generator-motors, or when the time to maintain the generator-motor output change to be changed quickly is increased, required response is different depending on the characteristics of a system. Therefore, the generator-motor output change amount may be used as a compensation value of a generator-motor secondary voltage angular velocity command value $\omega_2^*$ and a compensation value of a generator-motor secondary current active power component command value $I_{2R}^*$ through a response adjustment function in order to deal with such situations. In this case, the compensation value of the generator-motor secondary voltage angular velocity command value $\omega_2^*$ estimates (calculates) a speed change (that is, a slip change) associated with control of the generator-motor secondary current active power component command value $I_{2R}^*$ and to allow the speed change.

(Fourth Embodiment)

Fourth Embodiment will be described. Hereinafter, description of parts common to First to Third Embodiments is omitted.

In the present embodiment, a fast change component of a generator-motor output demand value $P_0$ (a difference between a generator-motor output command value $P^*$ and a generator-motor output demand value $P_0$, to which change rate limit is applied and changed) may be used as a compensation value of a generator-motor secondary voltage angular velocity command value $\omega_2^*$ and a compensation value of a generator-motor secondary current active power component command value $I_{2R}^*$. In this case, the compensation value of the generator-motor secondary voltage angular velocity command value $\omega_2^*$ estimates (calculates) a speed change (that is, a slip change) associated with control of the generator-motor secondary current active power component command value $I_{2R}^*$ and to allow the speed change.

Figure 11:
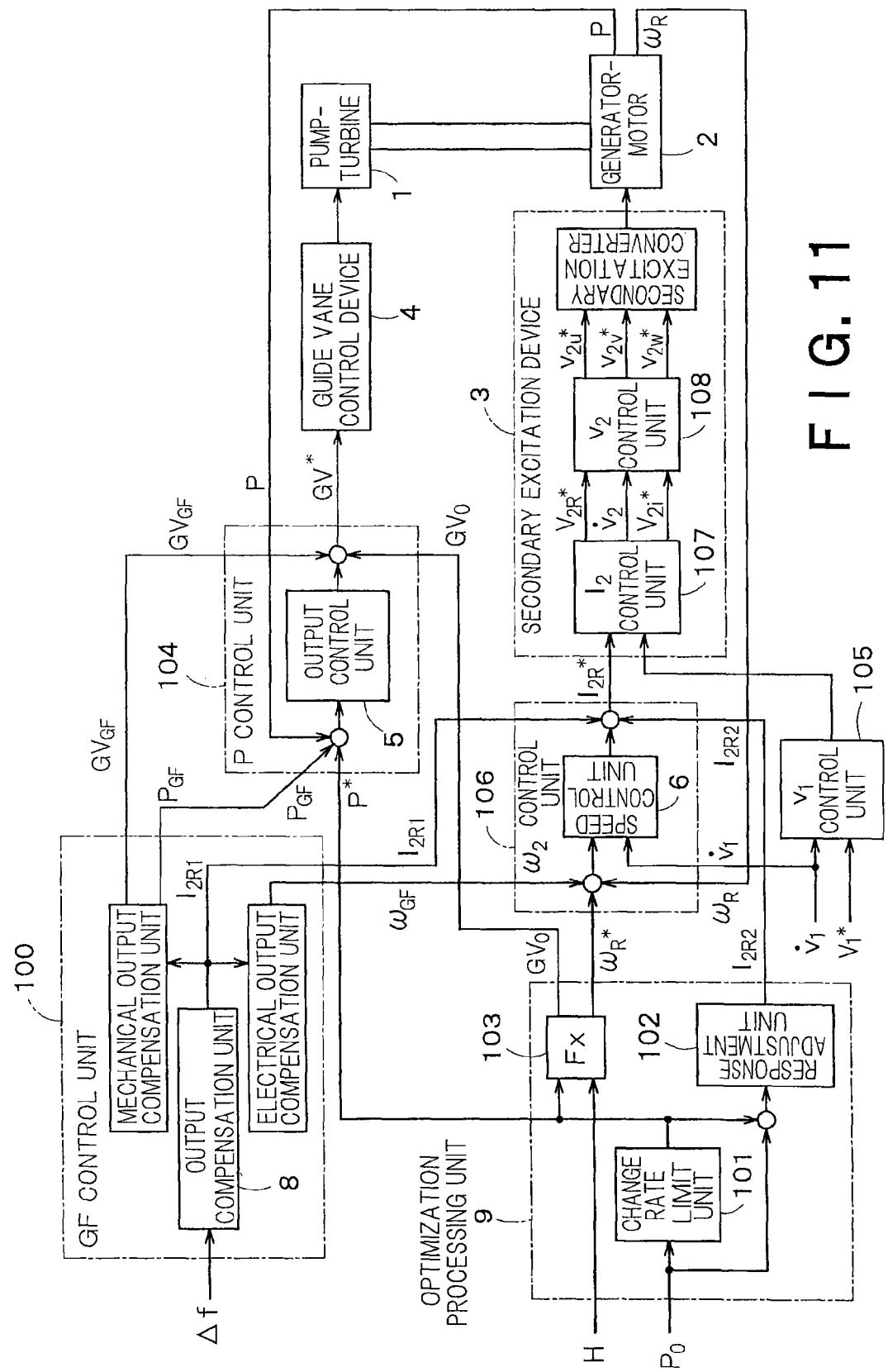
FIG. 11 is a detailed diagram of the variable speed pumped storage hydropower system of FIG. 10D.

In the above described First Embodiment, as illustrated in FIG. 2, an example in which the GF control unit 100 generates the generator-motor output governor-free compensation value $P_{GF}$ and the guide vane opening governor-free compensation value $GV_{GF}$ has been described. However, these signals can be generated by a third output compensation unit (mechanical (pump-turbine) output compensation unit), as illustrated in FIGS. 10A to 10D, for example. FIGS. 10A to 10D correspond to one in which the third output compensation unit is further provided in the variable speed pumped storage hydropower system illustrated in FIGS. 1A to 1D. Further, FIG. 11 is a detailed configuration diagram of a variable speed pumped storage hydropower system illustrated in FIG. 10D. FIG. 11 illustrates a second output compensation unit as an electrical output compensation unit and a third output compensation unit as a mechanical (pump-turbine) output compensation unit.

The third output compensation unit inputs an output of an output compensation unit 8, calculates a compensation value of an output command value (mechanical (pump-turbine) output command value) of an output control unit 5, and outputs the compensation value to the output control unit 5. For example, the third output compensation unit outputs a generator-motor output governor-free compensation value $P_{GF}$ to an arithmetic unit provided at a preceding stage of the output control unit 5 and performing subtraction processing. Further, for example, the third output compensation unit outputs a guide vane opening governor-free compensation value $GV_{GF}$ to an arithmetic unit provided at a succeeding stage of the output control unit 5 and performing addition processing. The third output compensation unit is configured from, for example, a divider 131, a function generator 132, and a response adjuster 133, illustrated in FIG. 5.

The third output compensation unit may generate either the generator-motor output governor-free compensation value $P_{GF}$ or the guide vane opening governor-free compensation value $GV_{GF}$. FIG. 12 illustrates a configuration in which, in the variable speed pumped storage hydropower system illustrated in FIG. 10A, the third output compensation unit only generates and outputs the guide vane opening governor-free compensation value $GV_{GF}$.

Further, FIG. 13 illustrates a configuration in which, the variable speed pumped storage hydropower system illustrated in FIG. 10A, the third output compensation unit only generates and outputs the generator-motor output governor-free compensation value $P_{GF}$.

As described in detail, according to the embodiments, the rotational speed change can be suppressed and the decrease in pump-turbine efficiency can be suppressed when a generator-motor output is changed.

The "slip", the "rotational speed", the "power system frequency", and the "secondary frequency" have the relationship as described in Expression 1 above. Further, the "rotational speed (r/s)" and the "angular velocity (rad/s)" have a relationship like the following Expression 2:

$$\text{Angular velocity} = 2\pi \times \text{Rotational speed} \quad \text{(Expression 2)}$$

Therefore, an optimization processing unit 9 may output a slip command value to a speed control unit 6 ($\omega_2$ control unit 106), or may output a rotational speed command value, an angular velocity command value, or a secondary frequency command value. The speed control unit 6 ($\omega_2$ control unit 106) can generate generator-motor secondary current active power component command value $I_{2R}^*$ based on the slip command value, the rotational speed command value, the angular velocity command value, or the secondary frequency command value received from the optimization processing unit 9.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A control system of a variable speed pumped storage hydropower system comprising:
    a secondary excitation device configured to apply a current to a secondary winding of a generator-motor;
    a flow rate adjusting valve control unit configured to control an opening of a flow rate adjusting valve that adjusts a flow rate of a pump-turbine connected with the generator-motor;
    an optimization processing unit configured to generate a generator-motor output command value based on a demanded generator-motor output, and to calculate and output a flow rate adjusting valve opening demand value and a first command value from a head value and the generator-motor output command value, the first command value including a slip command value, a rotational speed command value, an angular velocity command value, or a secondary frequency command value;
    a speed control unit configured to generate a secondary current active power component command value of the secondary excitation device based on the first command value;
    an output compensation unit configured to calculate a compensation value of the secondary current active power component command value;
    a mechanical output compensation unit configured to input an output of the output compensation unit, and to calculate at least either a compensation value of the opening of the flow rate adjusting valve or a compensation value of the generator-motor output; and
    an output control unit configured to generate a flow rate adjusting valve opening command value based on the generator-motor output command value, the flow rate adjusting valve opening demand value, the compensation value calculated by the mechanical output compensation unit, and an output detection value of the generator-motor, and to output the flow rate adjusting valve opening command value to the flow rate adjusting valve control unit.

2. The control system according to claim 1, wherein the output of the output compensation unit is used as a compensation signal of the secondary current active power component command value.

3. The control system according to claim 1, wherein the output compensation unit calculates the compensation value of the secondary current active power component command value from a power system frequency deviation.

4. The control system according to claim 1, further comprising:
    an electrical output compensation unit configured to input the output of the output compensation unit, to calculate a compensation value of the first command value, and to output the compensation value of the first command value to the speed control unit.

5. The control system according to claim 1, wherein the optimization processing unit includes a fast component extraction unit configured to extract a fast component from a demanded generator-motor output change amount, and to output the fast component to the output compensation unit.

6. A method of controlling a variable speed pumped storage hydropower system including a secondary excitation device configured to apply a current to a secondary winding of a generator-motor, a flow rate adjusting valve control unit configured to control an opening of a flow rate adjusting valve that adjusts a flow rate of a pump-turbine directly connected with the generator-motor, and a speed control unit configured to generate a secondary current active power component command value of a secondary excitation device, the method comprising:
    an optimization processing process of generating a generator-motor output command value based on a demanded generator-motor output, and calculating and output a flow rate adjusting valve opening demand value and a first command value from a head value and the generator-motor output command value, the first command value including a slip command value, a rotational speed command value, an angular velocity command value, or a secondary frequency command value, by a control system;
    a speed control process of generating a secondary current active power component command value of the secondary excitation device based on the first command value;
    an output compensation process of calculating a compensation value of the secondary current active power component command value;
    a mechanical output compensation process of calculating at least either a compensation value of the opening of the flow rate adjusting valve or a compensation value of the generator-motor output from a result calculated in the output compensation process; and
    an output control process of generating a flow rate adjusting valve opening command value based on the generator-motor output command value, the flow rate adjusting valve opening demand value, the compensation value calculated in the mechanical output compensation process, and the output detection value of the generator-motor, and outputting the flow rate adjusting valve opening command value to the flow rate adjusting valve control unit.

7. The method according to claim 6, wherein the result calculated in the output compensation process is used as a compensation signal of the secondary current active power component command value.

8. The method according to claim 6, wherein, in the output compensation process, the control system calculates a compensation value of the secondary current active power component command value from a power system frequency deviation.

9. The method according to claim 6, further comprising an electrical output compensation process of calculating a compensation value of the first command value from the result calculated in the output compensation process, and outputting the compensation value of the first command value to the speed control unit.

10. The method according to claim 6, wherein the optimization processing process includes a fast component extraction process of extracting a fast component from a demanded generator-motor output change amount, and outputting the fast component to the output compensation unit.

* * * * *